United States Patent [19]
Duncan

[11] 3,822,075
[45] July 2, 1974

[54] PNEUMATIC TUBE COUPLING

[75] Inventor: James C. Duncan, Canton, Ohio

[73] Assignee: Diebold, Incorporated, Canton, Ohio

[22] Filed: Aug. 15, 1972

[21] Appl. No.: 280,773

[52] U.S. Cl. ............................................. 285/367
[51] Int. Cl. .............................................. F16l 17/00
[58] Field of Search ......... 285/367, 366, 365, 407, 285/408, 409, 410, 411, DIG. 12

[56] References Cited
UNITED STATES PATENTS

| | | | |
|---|---|---|---|
| 2,457,077 | 12/1948 | Woolsey | 285/410 X |
| 2,460,984 | 2/1949 | Hill et al. | 285/367 X |
| 2,548,216 | 4/1951 | Houghton et al. | 285/408 |
| 2,628,851 | 2/1953 | Jessup | 285/411 X |
| 3,042,430 | 7/1962 | Guy | 285/365 |
| 3,084,959 | 4/1963 | Stanton | 285/DIG. 12 |
| 3,099,060 | 7/1963 | Smith | 285/367 X |
| 3,235,293 | 2/1966 | Condon | 285/367 X |
| 3,359,018 | 12/1967 | Simons | 285/367 |
| 3,494,643 | 2/1970 | Longshaw et al. | 285/365 |

Primary Examiner—Dennis L. Taylor
Attorney, Agent, or Firm—Joseph Frease; Michael Sand

[57] ABSTRACT

A coupling construction for coupling tube sections of pneumatic tube systems together in axial alignment. The coupling involves outturned flanges at the ends of adjacent tube sections. A flexible band having inturned angled fingers engage and compress cooperating portions of a generally trough-shaped rubber gasket against and surrounding the tube section flanges. A typical high torque strap-type hose clamp surrounds the flexible band and is tightened to reduce the effective diameters on the band and gasket and to apply compressive forces to the trough-shaped rubber gasket.

4 Claims, 16 Drawing Figures

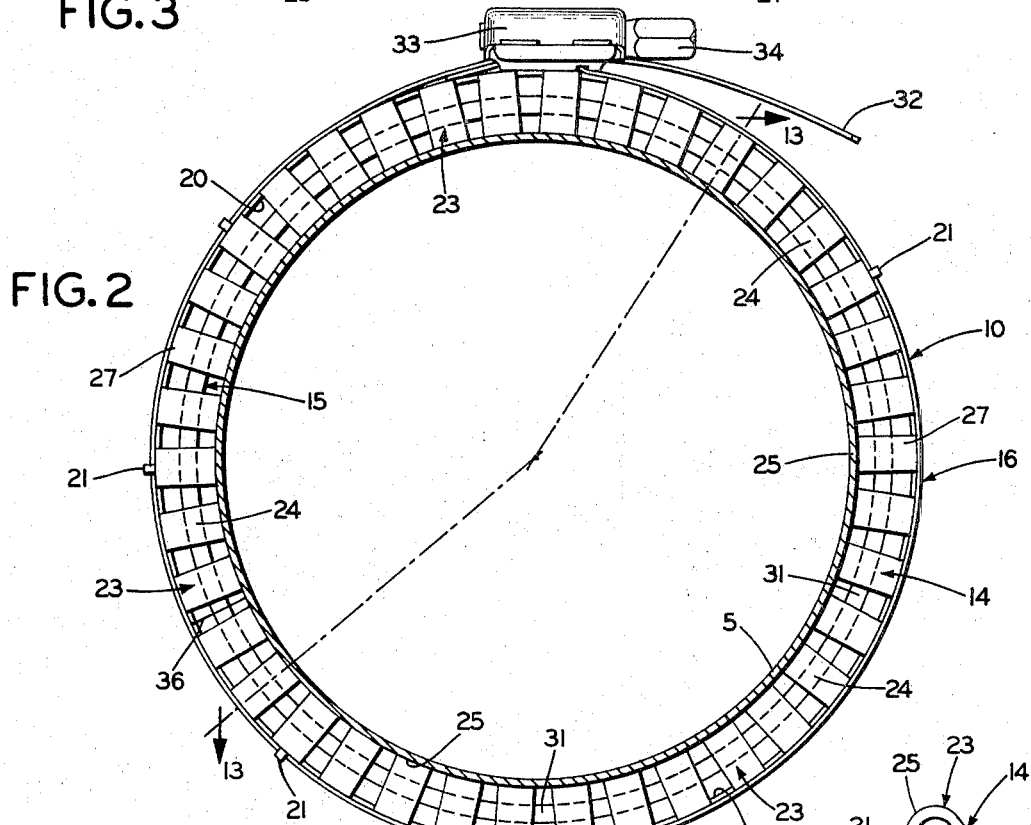

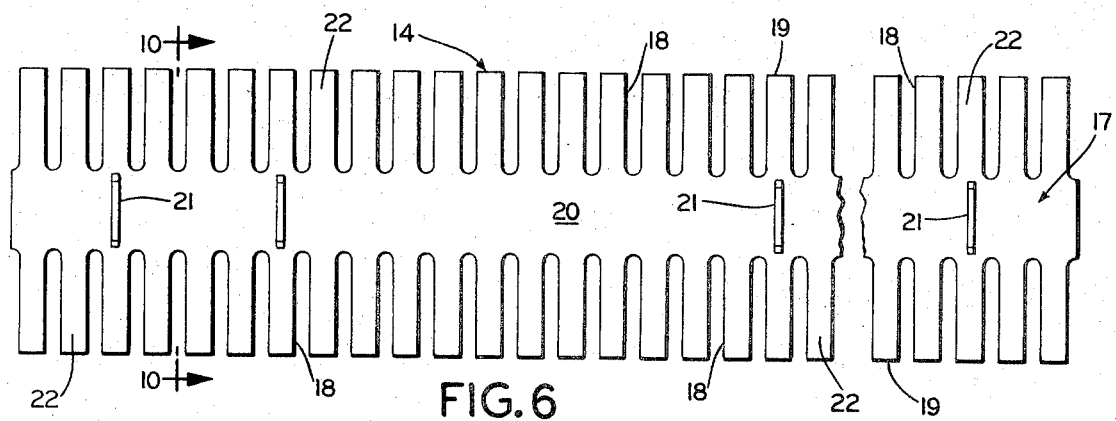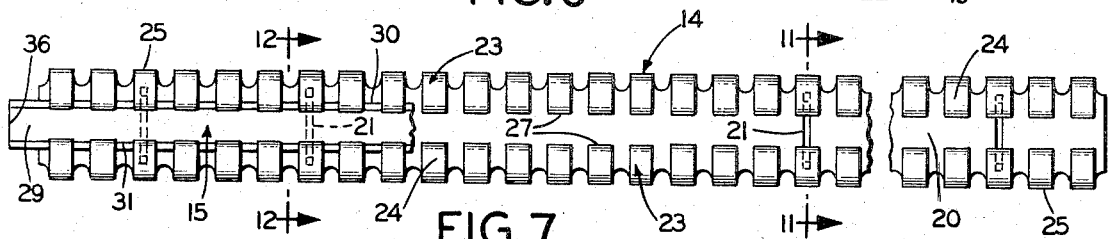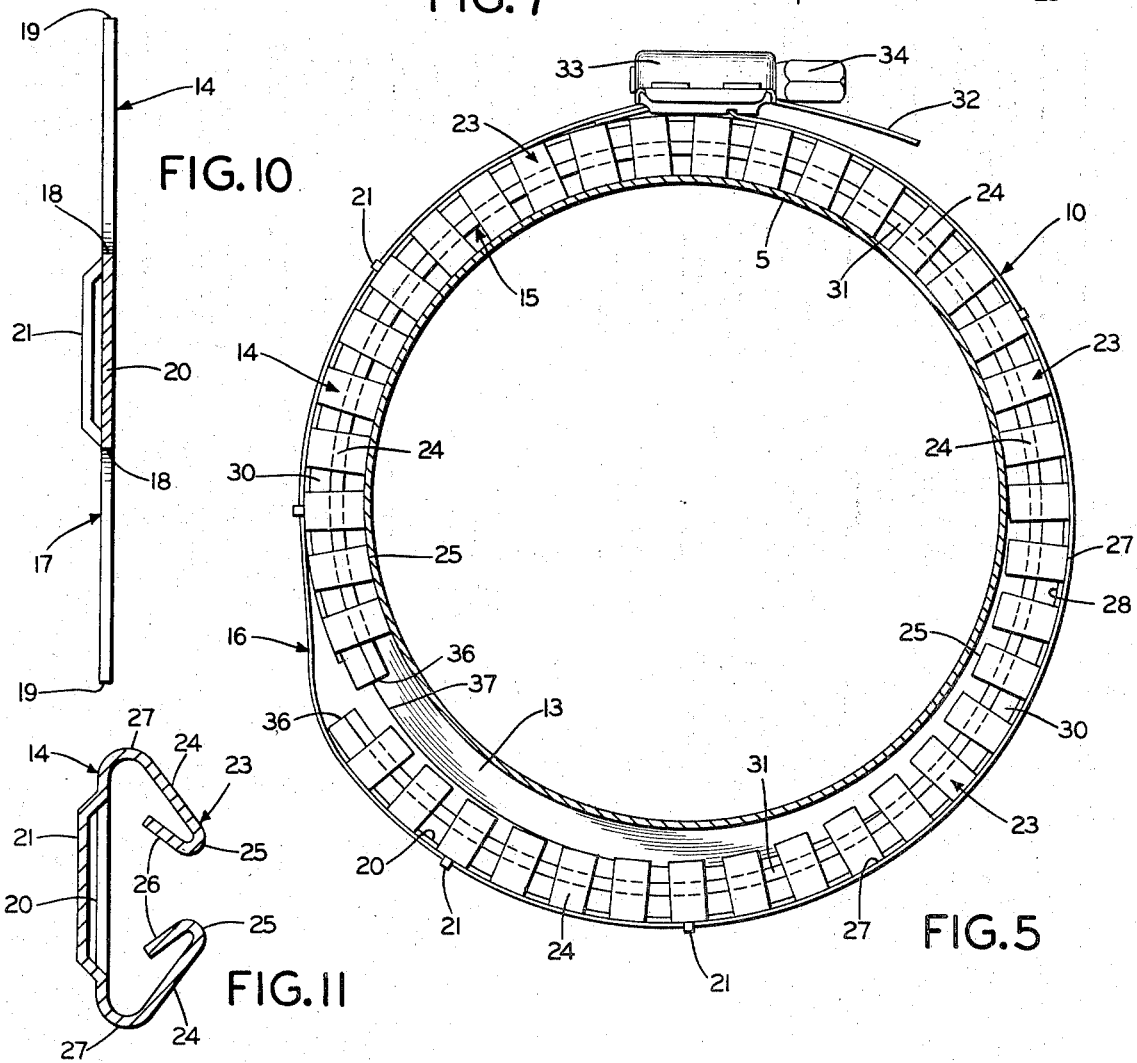

PNEUMATIC TUBE COUPLING

CROSS REFERENCE TO RELATED APPLICATIONS

Pneumatic tube systems having pneumatic tubes formed by tube sections coupled together with the improved tube coupling construction may receive carriers such as shown in the copending application of Barnett and Morrison, Ser. No. 208,756, filed Dec. 16, 1971, and in copending application of Ekama and Brown, Ser. No. 268,861, filed July 3, 1972, and any carrier may be equipped with carrier wear ring constructions such as shown in copending application of Barnett and Ekama Ser. No. 268,830, filed July 3, 1972.

BACKGROUND OF THE INVENTION

1. Field of the Invention

The invention relates to pneumatic tube systems and more particularly to the tube construction and to couplings for adjacent tube sections used to install such systems. Furthermore, the invention relates particularly to a tube section coupling construction which adapted for connecting adjacent curved or straight tube sections, which may pass underground or overhead between buildings or within buildings to effectively seal the sections together with an airtight joint under vacuum and pressure conditions, and which accommodates some axial misalignment of adjacent sections, either angular or offset, which inevitably occur in the installation of pneumatic tube systems having relatively large sized cylindrical or oval tube contours, say 4½ diameter tubes where cylindrical, or 4 inches × 7 for oval tubes.

2. Description of the Prior Art

Prior art pneumatic tube systems have had tube sections, either oval or cylindrical in cross section, coupled together at adjacent tube section ends with clamping and sealing means such as shown, for example, in U.S. Pat. No. 3,237,884. The increased use of pneumatic tube systems for performing banking services between a teller station and a remote customer station involves the installation of a tube system, connected overhead between remote locations in one or more buildings, or connected underground between remote locations.

The installation of such pneumatic tube systems involves the use of straight and curved tube sections which must be coupled together end to end with an airtight joint through which carriers may pass without interference with the carrier by the tube coupling or joint. Frequently, the installation of such tube systems involves installing sections running from both of the remote stations and which finally are joined at an intermediate location, where some axial misalignment either angular or offset may occur.

Heretofore, it has been difficult to provide an airtight joint under conditions of misalignment between adjacent tube sections. Furthermore, prior sectional pneumatic tube systems have involved costly airtight joint constructions which have been difficult to install, service or replace.

Initial attempts to eliminate difficulties inherent in prior pneumatic tube section coupling constructions involved use of a generally V-shaped gasket with a V-shaped groove. However, this V-shaped construction was completely inadequate and did not provide a reliable and repeatable seal, annularly around the outturned flanges of the tube sections; and the mating ends of such V-shaped and V-grooved gasket did not provide an airtight seal at the gasket ends.

Also, efforts to assemble a metal clamping bracket with fingers adapted to compress the V-shaped gasket against the tube section flanges by pulling angle brackets fixed to the adjacent ends of the clamping bracket together with bolt means, hose-clampfashion, crushed the metal fingers under the angle brackets engaged by the bolt means, instead of exerting tangential force around the perimeter of the coupling which was discovered necessary to provide a uniform and sufficient seal entirely throughout the perimeter of the gasket.

Furthermore, prior attempts to avoid the indicated difficulties did not effectively accommodate axial misalignment of adjacent tube sections to eliminate such misalignment at the tube joint when completely formed to be airtight.

Thus, a need has existed for a pneumatic tube system coupling construction which provides an efficient airtight sealed joint, that is low in cost, easy to install or replace, which accommodates some angular flexibility or misalignment at the joint without loss of airtight integrity; and which avoids all of the difficulties described that have been encountered in trying to satisfy the need.

SUMMARY OF THE INVENTION

Objectives of the invention include providing a new coupling construction for the joints between adjacent tubular sections of a pneumatic tube system, which accommodates tube section misalignment or angular flexibility and provides an airtight joint under conditions of vacuum or pressure; providing a new pneumatic tube coupling construction involving a flexible band having a series of inturned angled fingers that engage and press the outturned flanges of adjacent tube sections together, and at the same time engage, press and compress portions of a trough-shaped rubber gasket surrounding contacting tube section flanges, against the edges and outer surfaces of the tube section flanges to form an airtight joint completely and uniformly around the perimeter of the joint; providing a new pneumatic tube coupling construction, which may be drawn up and clamped in uniform airtight condition against tube section flanges with a separate strap-type hose clamp; providing a new pneumatic tube coupling construction having components that are simple in design and construction, inexpensive to manufacture and assemble, easy and effective to install, service, repair or replace and which provide an effective and efficient airtight joint; providing a new coupling construction for joints between adjacent tube sections which includes as components a flexible band having inturned angled gasket and tube flange engaging fingers, a gasket having a special contour which will form an effective seal throughout the perimeter of adjacent tube section end flanges engaged by the gasket when the gasket is laterally, radially and circumferentially compressed, and a separate strap-type hose clamp to impart tangential force to the flexible band to thus exert the stated compressive forces on the gasket; providing a new pneumatic tube coupling construction in which clamping forces are applied to a flexible band having a series of inturned angled fingers and a gasket trough-shaped in cross section engaged by the band fingers, which eliminates crushing of certain of the band fingers incident to imparting tangential forces to the band to tighten the band around the tube section flanges for forming an airtight joint; and providing a new coupling construction for forming airtight joints between flanged ends of adjacent tube sections of a pneumatic tube system which achieves the stated objectives in an effective and efficient manner, which avoids the described difficulties, and which solves problems and satisfies needs existing in the art.

These and other objectives and advantages may be obtained by the pneumatic tube system coupling construction, the general nature of which may be stated as including, outturned flanges having outer edges and surfaces formed on adjacent ends of tube sections to be coupled; a flexible metal band surrounding adjacent tube section flanges, the band having an outer perimeter and two axially spaced series of circumferentially spaced fingers, the band having a central longitudinal portion from which the fingers extend laterally at each side, each finger being connected with the central portion by a rounded bead-like portion extending through an intermediate finger portion inwardly angularly to a reversely curved portion forming a shoulder, the reversely curved portion terminating inside of and spaced from the intermediate portion in an upwardly outwardly extending hook-shaped angular end portion; and elastomer gasket confined within the band having an outer annular flat base surface engaged by the central band portion, the gasket having spaced annular side and angled edges extending between the flat surface and an annular trough-like internal gasket surface, the angled gasket edges being engaged by the hook-shaped finger end portions, and the gasket trough-like surface extending around the perimeter of the tube section flanges engaging the outer flange surfaces and edges; loop means formed in the central band portion; the band and gasket having split-ring form for assembly around the tube section flanges; the split-ring gasket having mating ends; and hose clamp means having a strap portion threaded through the loop means and slidably engaged with the outer perimeter of the central band portion, and means for tensioning the strap portion around the band to impart circumferential, radial and axial compressive forces to the gasket through the band and its fingers to form an airtight joint between the tube section flanges and the mating ends of the gasket.

BRIEF DESCRIPTION OF THE DRAWINGS

A preferred embodiment of the invention - illustrative of the best mode in which applicant has contemplated applying the principles - is set forth in the following description and shown in the drawings, and is particularly and distinctly pointed out and set forth in the appended claims:

FIG. 2 is a side view of the components of the coupling construction in installed condition;

FIG. 3 is a top plan view of the parts shown in FIG. 2;

FIG. 4 is a fragmentary side view on an enlarged scale with parts broken away from components of the coupling;

FIG. 5 is a view similar to FIG. 2 showing the flexible band, gasket and clamp being assembled to form an airtight joint;

FIG. 6 is a plan view of the flexible metal band as initially formed in the flat;

FIG. 7 is a view of the band shown in FIG. 6 reformed to provide spaced inturned angled flanges thereon; and showing a fragmentary portion of the gasket of FIG. 8 assembled with the band;

FIG. 8 is a plan view of the rubber gasket;

FIG. 9 is an enlarged sectional view taken on the line 9—9, FIG. 8;

FIG. 10 is an enlarged sectional view taken on the line 10—10, FIG. 6;

FIG. 11 is an enlarged sectional view taken on the line 11—11, FIG. 7;

FIG. 12 is an enlarged sectional view of the band of FIG. 7 with the gasket of FIG. 8 assembled therewith; taken on line 12—12, FIG. 7;

FIG. 14 is a diagrammatic view, showing the coupling forming an airtight joint where the adjacent tube sections are angularly misaligned;

Similar numerals refer to similar parts throughout the various figures of the drawings.

DESCRIPTION OF THE PREFERRED EMBODIMENT

Figure 1:
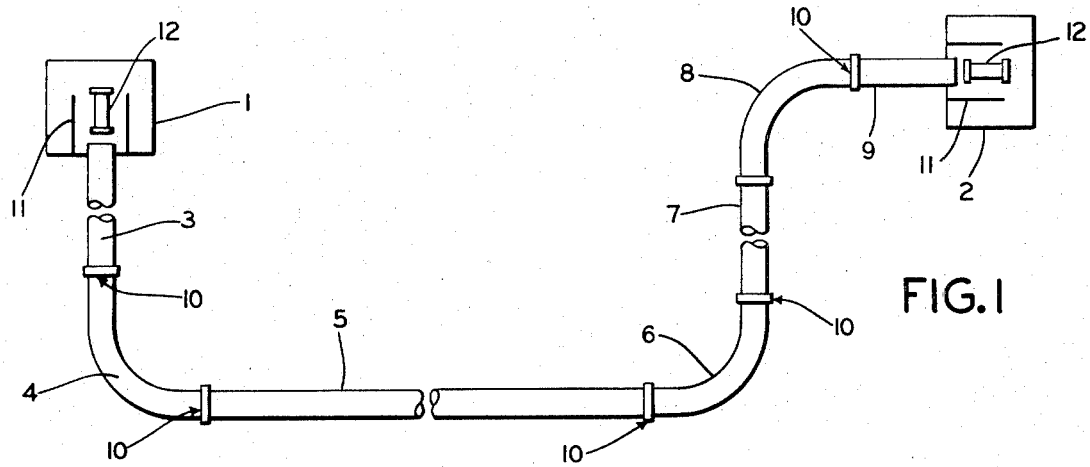
FIG. 1 is a diagrammatic view of a pneumatic tube system having terminal stations connected by tube sections including several curved tube sections.
Figure 13:
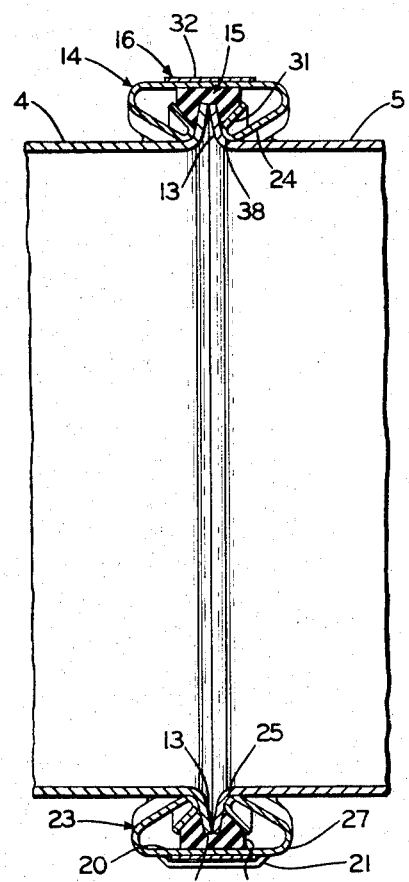
FIG. 13 is an enlarged axial section of one of the couplings illustrated diagrammatically in FIG. 1; on line 13—13, FIG. 2.

A typical pneumatic tube system for conducting banking services is illustrated diagrammatically in FIG. 1 and may include a teller station 1 and a customer station 2, connected by a pneumatic tube formed by sections 3, 4, 5, 6, 7, 8 and 9. Tube sections 4, 6, and 8 are illustrated as being curved tube sections and are joined or coupled at 10 with adjacent straight tube sections 3, 5, 7 and 9. The arrangement illustrated in FIG. 1 may involve an underground connection between stations 1 and 2; or in the alternative, the tube system between stations 1 and 2 may run overhead within a building with the tube extending upward from station 1 and then downward to station 2.

Each station 1 and 2 involves a tube terminal portion 11 where a carrier illustrated at 12 may be accessible to the user. Normally, only one carrier is in use for the system; and the carrier may be a non-captive carrier which may be removed at either station 1 or 2 from the terminal 11 thereof either by the teller or the customer.

In accordance with usual practice, audible communication may be provided by a speaker system connected between stations 1 and 2; and stations 1 and 2 may be so located that there is visual communication, such that the teller at station 1 may see a customer at station 2, and vice versa.

However, stations 1 and 2 may be located more remotely from one another so that visual communication is not possible, in which event a closed circuit television system may be used, connected between stations 1 and 2 for television communication therebetween.

The coupling indicated diagrammatically at 10 in FIG. 1 is shown in more detail in FIGS. 2 to 5 and 13, 15 and 16. Each coupling 10 involves outturned flange formations 13 at the abutting ends of each tube section such as the sections designated generally at 4 and 5 in each of FIGS. 2 to 5 and 13, 15 and 16. The coupling construction includes a flexible band generally indicated at 14, a preferably rubber-like gasket generally indicated at 15, and a hose clamp generally indicated at 16, formed and assembled as described below.

The flexible band 14 preferably is stamped from a strip metal blank 17 (FIG. 6) with a series of notches 18 extending laterally of the strip blank 17 from its side edges 19 to a central band portion 20. A series of lanced offset loops 21 is formed in the central band portion 20 of flexible band 14.

After initially stamping the blank 17 with notches 18 and lances 21, the fingers 22 are reformed to the inturned angular shape best indicated generally at 23 in FIG. 11. Each of the inturned angular fingers 23 has an intermediate straight portion 24, a reversely curved shoulder portion 25 and a hook shaped straight end portion 26. The intermediate finger portion 24 is connected with the central band portion 20 of flexible band 14 by a rounded bead-like portion 27.

The gasket 15 (FIGS. 8 and 9) preferably is formed of an elastomer, such as an ethl-propylene terpolmer having a very high tear strength to avoid tearing of the material as the tube flanges 13 are forced into the gasket material in forming the sealed joint. The elastomer gasket material is rubber-like and sometimes is referred to herein as being rubber or rubber-like.

The cross-sectional shape of the gasket 15 is an important aspect of the invention, best shown in FIGS. 9 and 12. The gasket 15 has a flat base surface 28, an opposite shallow trough-like concavely rounded surface 29, side edges 30, and angled edges 31 connecting the side edges 30 and the trough-like surface 29.

The gasket 15 is assembled with the flexible band 14 as shown in FIG. 12 so that the flat gasket base 28 engages the central band portion 20 of the band 14. The angled gasket edges 31 are located opposite and are adapted to be engaged by the hooked straight ends 26 of the fingers 22. This leaves the trough-like surface 29 open and exposed between the opposite sets of fingers 22.

The strap-type hose clamp 16 is a typical clamp component used in many fields for various purposes. It comprises a strap 32 to one end of which a housing 33 is connected on which a clamping screw 34 is journaled, the threads of which engage in a series of thread slots 35 formed in the other end portion of the strap 32. The separate hose clamp 16 is threaded through the slots formed by the lanced loops 21 in the central band portion 20 of flexible band 14 as best shown in FIGS. 2, 3 and 5. The separation of hose clamp 16 from the flexible band 14 having the angled fingers 23 thereon, constitutes a further important aspect of the invention.

Assembly and Operation of Coupling Components

The separable band, gasket and clamp components 14, 15, and 16 of the coupling construction are assembled together as shown in FIGS. 12 and 10, and are located to generally surround the outturned flange formations 13 at adjacent ends of the tube sections 4 and 5 (FIGS. 5 and 16) to be coupled. Clamp strap 32 then is pulled up or tensioned circumferentially by manipulation of the clamp screw 34 until the parts reach the position shown in FIG. 2.

Initially, when gasket 15 is assembled with flexible band 14 as shown in FIG. 12, and when these parts are in the flat as illustrated in FIGS. 7 and 8, the band and gasket 14 and 15 may have approximately the same length. However, when the band 14 and gasket 15 are reshaped generally to circular form to be applied to and to encompass the flanges 13 of adjacent tube sections 4 and 5 to be coupled, the ends 36 of gasket 15 project beyond the ends of flexible band 14, as shown in FIG. 5, and as diagrammatically illustrated at the left end of FIG. 7 wherein the gasket 15 has not been fully telescoped within the flexible band 14.

Figure 16:
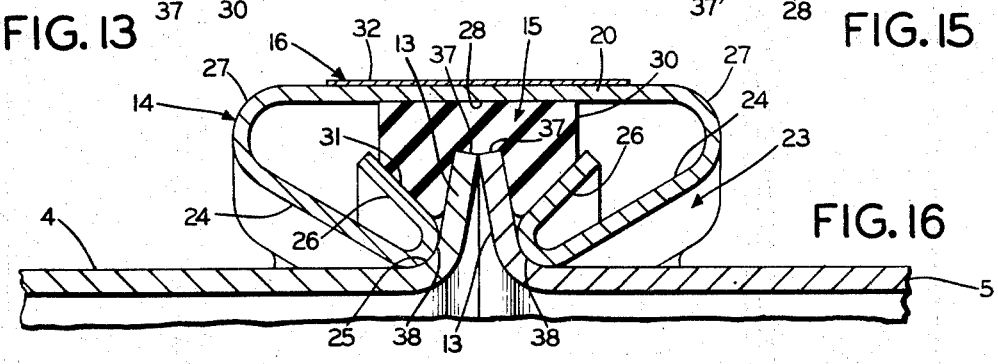
FIG. 16 is an enlarged fragmentary sectional view of a portion of FIG. 13, illustrating the manner in which a seal is effected by the improved coupling construction.

When the hose clamp 16 is tensioned, the strap 32 thereof is free to slip circumferentially with respect to the multifingered flexible band 14. As clamp 16 is tightened from the position shown in FIG. 5 to that of FIG. 2, an airtight seal is obtained uniformly and entirely around the perimeter of the adjacent tube section flanges 13, as illustrated in FIG. 16. During the tightening of clamp 16 around multi-fingered band 14, the gasket 15 is compressed by central band portion 20 radially inward against the free edges 37 of the tube section flanges 13, and also somewhat axially against the outer faces of the tube section flanges 13.

The relative thickness of material between gasket base 28 and the shallow trough-like surface 29 as shown in FIGS. 9, 12 and 16, provide sufficient material thickness for receiving tube flange edges 37 without the sharp edges cutting completely through the gasket. Thus, the need of forming special shaped flange edges free of sharp projections and corners is eliminated. Likewise, when coupling 10 is correcting minor tube misalignment during installation the longer flange edge 37 can move sufficiently into the rubber material of gasket 15 without appreciably affecting the seal formed between trough-like surface 29 and the shorter flange edge as shown by the dot-dash lines in FIG. 15.

At the same time, as the circumference of the band 14 is reduced in diameter through tangential tensioning around its perimeter by clamp 16, the curved shoulders 25 on the fingers 23 of band 14 seat in the fillets 38 at the base of the tube section flanges 13 drawing these flanges toward each other and establishing axial alignment of the adjacent tube sections 4 and 5, at least at the resulting sealed joint.

Meanwhile, and at the same time, the straight areas of the hooked ends 26 of the fingers 22 engage the angled edges 31 of gasket 15, compressing the gasket material in a generally axial direction against the tube section flanges 13. The straight areas of finger ends 26 provide a continuous and broad sealing surface for engagement with gasket edges 31 to enable a sufficient airtight seal to be formed therewith.

Also, meanwhile, the material of gasket 15 is compressed generally circumferentially around its periphery, to take up the projecting end portions 36 of the gasket 15 within a reduced diameter confined location. Since the free ends of gasket 15 engage and are compressed against each other, and since these ends each have considerable area, viewing FIG. 9, an efficient airtight seal is formed at the mating ends 36 of gasket 15. This aspect of the invention corrects a deficiency encountered in prior coupling constructions wherein the mating ends of a gasket had inadequate cross-sectional area to effect an airtight seal. Furthermore, the use of a separate clamp 16 which can slip with respect to the band 14, as the strap 32 is tightened and exerts tangential force, eliminates problems encountered with prior structures where angle brackets were fixed to the ends of a band such as the band 14 and the brackets were pulled together by bolt means in an attempt to form the airtight seal. With this prior construction, the fixed angle brackets when pulled toward each other, crushed the metal fingers directly beneath, against the adjacent tube section end portions, which prevented sufficient tangential force from being applied around the perimeter of the band to effect an airtight seal completely around the perimeter of the flanged tube section ends.

Figure 15:
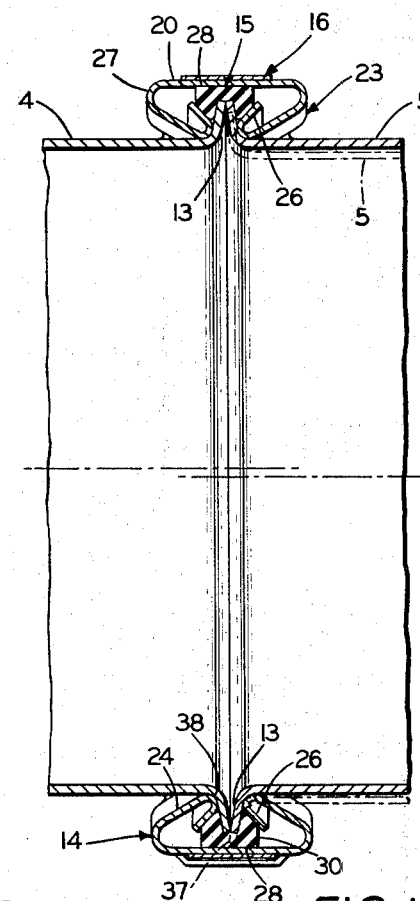
FIG. 15 is a view similar to FIG. 13, showing the coupled joint where the adjacent tube sections initially are axially offset.

FIGS. 14 and 15 diagrammatically illustrate several further important features or aspects of the invention. Referring first to FIG. 14, if a condition occurs during installation of the pneumatic tube system, for example, where tube sections are installed underground or overhead from two locations to meet at a central region, and where there may be angular axial misalignment of two adjacent tube sections indicated at 4a and 5a in FIG. 14, and where such axial misalignment may be up to 10° as illustrated in FIG. 14, the improved coupling construction of coupling 10 functions to draw the angularly axially misaligned tube ends together and form an airtight seal. This in part is believed to result from the engagement of the finger shoulders 25 with the fillets 38 of the tube flanges 23 coincidentally with the pressure exerted by the central band portion 20 and the hooked ends 26 of the fingers of band 14 on the several engaged surfaces of gasket 15.

The straight configuration of intermediate leg 24 transmits the radial compression force exerted on band 14 by strap 16 in a generally axial direction directly against tube fillets 38 preventing finger shoulder portions 25 from curling upwardly along the tube flange as the clamping force is applied thereto. -;

The same result is achieved, as illustrated in FIG. 15, of forming an airtight joint where there is axially offset misalignment of the adjacent tube sections 4 and 5. The axial misalignment is indicated by the dot-dash lines 5b for the tube section 5 with axes 4c and 5c for the two tube sections 4 and 5 offset as illustrated, before the coupling is made. As the coupling components are engaged and tightened, the adjacent ends of the tube sections 4 and 5 are pulled into axial alignment, indicated in full lines, from the unaligned dot-dash position shown.

In General

The various aspects of the cooperative relationship between the components of the new coupling construction for pneumatic tube systems, including the abilitiy to form an efficient and complete airtight joint between flanged adjacent tube sections, even where there may be some axial misalignment either angular or offset, involve a remarkable combination of features and results. The coupling produces an airtight joint under situations where such joint could not be formed with prior structures. The coupling components are of simple design and construction and thus have a low cost per joint. Any joint and coupling may be installed or the coupling opened up or replaced in event that it is necessary to gain access to the interior of the tube system, by one man using merely a screw driver. Installation assembly does not involve any critical steps or procedures. Angular flexibility is provided without loss of airtight integrity. No cutting or reforming of the tubing is required in order to replace the coupling components.

Accordingly, the improved construction provides an efficient, simple, inexpensive, easy to install and repair coupling construction for adjacent flanged ends of tube sections of a pneumatic tube system which achieves the objectives stated and eliminates difficulties that have characterized prior constructions, and solves problems and obtains the new results described.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example and the scope of the invention is not limited to the exact details of construction shown or described. Thus, the tube coupling construction is applicable to an oval pneumatic tube system for coupling adjacent flanged ends of tube sections having an oval cross section. Further the elastomer gasket material may be a rubber composition or compound, neoprene, or plastic compositions having tear resistance, flexibility and compressibility to provide the seals described.

Having now described the features, discoveries and principles of the invention, the manner in which the improved coupling is assembled and in which it functions, the characteristics of the new construction, and the advantageous, new and useful results obtained; the new and useful structures, devices, elements, arrangements, parts and combinations are set forth in the appended claims.

I claim:

1. Coupling construction for tube sections of a pneumatic tube system including, outturned flanges having outer edges and surfaces formed on adjacent ends of tube sections to be coupled; said outturned flanges being joined with the tube sections by annular fillets; a flexible metal band surrounding adjacent tube section flanges, the band having a central outer perimeter and two axially spaced series of circumferentially spaced inturned angular fingers extending from the central band portion; each finger being connected with the central band portion by a rounded bead-like portion and having a straight intermediate finger portion extending inwardly angularly from the bead-like portion; the intermediate portion having a reversely curved portion forming a shoulder portion, said reversely curved portion terminating inside of and spaced from the intermediate portion in an upwardly, outwardly extending straight end portion; the finger shoulder portions engaging the fillets of the adjacent tube sections; an elastomer gasket confined within the band and between the two spaced series of band fingers; the gasket including an annular internal surface, having a shallow trough-like configuration, extending around the perimeter of the tube section flanges; said gasket further including an annular flat base surface engaged by the flexible metal band, and spaced annular side edges extending between the base and trough-like internal surface; said gasket side edges being engaged by the upwardly outwardly extending finger end portions, and said gasket trough-like internal surface being engaged by the tube section flanges outer edges; hose clamp means having a strap portion slidably engaged with the central outer perimeter of the flexible band and tensioned therearound; said clamp means imparting generally axial compressive forces through the straight intermediate finger portions between the finger shoulder portions and the tube fillets to press adjacent tube section flanges toward each other, and imparting generally axial compressive forces between the finger end portions and gasket side walls pressing the internal gasket surface against the tube flanges to form an airtight joint between the tube section flanges; and said clamp means imparting circumferential and radial compression forces between the tube section flanges outer edges and the trough-like internal gasket surface to form an additional seal between the tube section flanges.

2. The coupling construction defined in claim 1 in which the gasket side edges include annular inwardly angled edge portions; in which said angled edge portions connect with the trough-like internal gasket portion; and in which said angled edge portions are engaged by the upwardly outwardly extending finger straight end portions.

3. The coupling construction defined in claim 1 in which the flexible metal band and the gasket confined within the band have split-ring form prior to being subjected to compressive forces by the hose clamp means; in which the split-ring gasket confined within the band has mating ends which extend beyond the ends of the split-ring band prior to being subjected to said compressive forces; and in which said mating gasket ends are engaged in airtight relation by circumferential compressive forces imparted to the gasket by the hose clamp means.

4. The coupling construction defined in claim 1 in which the flexible metal band and gasket confined within the band each have split-ring form prior to being subjected to compressive forces by the hose clamp means; in which the band has a series of lanced loops formed at spaced intervals about its outer perimeter; in which the hose clamp means strap portion is threaded through said spaced loops entirely around the outer perimeter of the split-ring band, and surrounding the edges of the tube section flanges engaged by the gasket; and in which the hose clamp means also includes clamping screw means, and thread slot means engaged by the screw means carried by the ends of the hose clamp strap portion to apply tension to the strap portion around the flexible band and gasket to close their split-ring form and seal the joint between the tube section flanges in airtight fashion.

* * * * *